(12) United States Patent
Echeruo et al.

(10) Patent No.: US 7,607,048 B2
(45) Date of Patent: Oct. 20, 2009

(54) METHOD AND APPARATUS FOR PROTECTING TLB'S VPN FROM SOFT ERRORS

(75) Inventors: Ugonna C. Echeruo, Worcester, MA (US); George Z. Chrysos, Milford, MA (US); John H. Crawford, Saratoga, CA (US); Shubhendu S. Mukherjee, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 411 days.

(21) Appl. No.: 11/026,633

(22) Filed: Dec. 30, 2004

(65) Prior Publication Data
US 2006/0150048 A1 Jul. 6, 2006

(51) Int. Cl.
*G06F 11/00* (2006.01)
(52) U.S. Cl. .......................................... 714/42; 714/718
(58) Field of Classification Search ................... 714/42, 714/718
See application file for complete search history.

(56) References Cited

U.S. PATENT DOCUMENTS

| 5,987,585 | A  | * | 11/1999 | Motoyama et al. ............. 712/1 |
| 6,718,494 | B1 | * | 4/2004  | Jamil et al. ................. 714/723 |
| 7,366,829 | B1 | * | 4/2008  | Luttrell et al. ............... 711/108 |
| 2003/0023932 | A1 | * | 1/2003 | Arndt et al. ................. 714/805 |
| 2004/0193992 | A1 | * | 9/2004 | Jamil et al. ................. 714/742 |

* cited by examiner

*Primary Examiner*—Emerson C Puente
(74) *Attorney, Agent, or Firm*—David P. McAbee

(57) ABSTRACT

A method and apparatus for protecting a TLB's VPN from soft errors is described. On a TLB lookup, the incoming virtual address is used to CAM the TLB VPN. In parallel with this CAM operation, parity is computed on the incoming virtual address for the possible page sizes supported by the processor. If a matching VPN is found in the TLB, its payload is read out. The encoded page size is used to select which of the set of pre-computed virtual address parity to compare with the stored parity bit in the TLB entry. This has the advantage of removing the computation of parity on the TLB VPN from the critical path of the TLB lookup. Instead it is now in the TLB fill path.

14 Claims, 4 Drawing Sheets

METHOD AND APPARATUS FOR PROTECTING TLB'S VPN FROM SOFT ERRORS

BACKGROUND INFORMATION

Modern processors are often heavily pipelined to increase operating frequencies and exploit parallelism. Data from successive stages is often stored or latched to provide inputs to the next pipeline stage. As fabrication processes improve over time, the size of storage elements decreases making them more susceptible to soft errors. Soft errors occur when incident radiation changes the electrical charge being held by a storage element, thereby changing its binary state. As the statistical significance of soft errors has been increasing, storage structures such as latches that were previously less prone to soft errors are now in need of protection.

Soft errors, if undetected, can silently corrupt data for a program during its execution. If the program continues to execute, incorrect results may be generated. This type of silent data corruption (SDC) is especially undesirable in mission critical applications, such as for commercial transaction server applications, where wrong results can have broad reaching implications.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the inventions.

DETAILED DESCRIPTION

Figure 1:
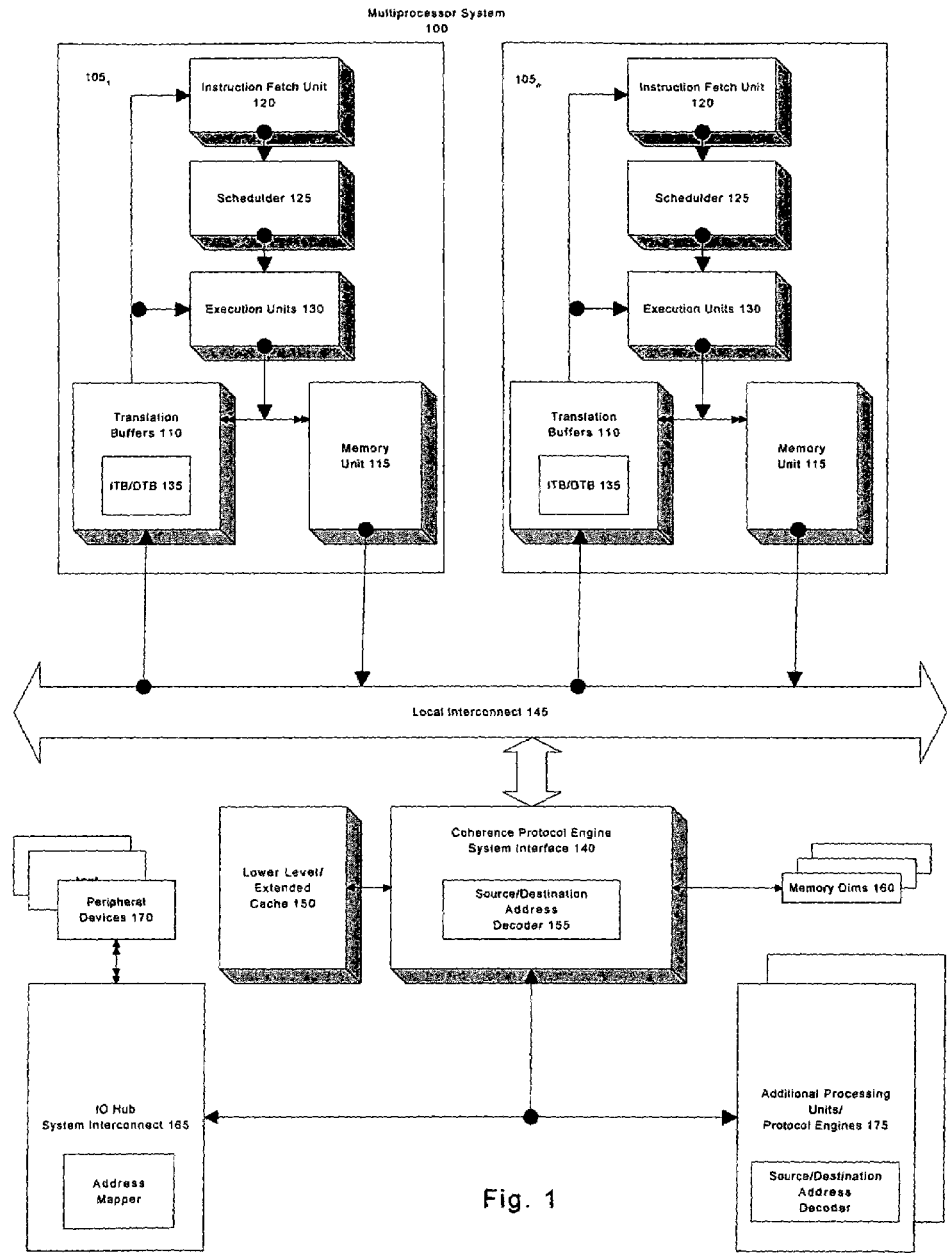
FIG. 1 is a block diagram of an example system protecting a TLB's VPN from soft errors.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

A computer or processor accesses memory locations to load and store data. To access memory, the processor uses the physical address (PA) of the data in memory. The PA at which data is stored in a memory is not the address that a processor uses to index the data during internal manipulations. The processor hardware will assign a virtual address (VA) to data being processed by instructions. The VA's and PA's are usually assigned differently so that data manipulations and memory use can both be optimized. Thus, memory accesses entail translating virtual addresses to physical addresses.

A physical memory is a collection of memory pages or blocks. The PA of a memory location is given by the page address and the relative address of the memory location on that page. Typically, only the virtual addresses of "pages" undergo translation. Relative addresses of memory locations on a page are assigned in the same way in the memory and internally in the processor.

A virtual memory maps a program's virtual addresses into a machine's physical memory addresses. Such mappings allow a microprocessor to be time-shared between multiple user processors. Usually, processors break up the virtual memory space into pages. Thus, to map a virtual address into a physical address, processors first translate the virtual page number (VPN) to a physical page number (PPN). Then, the processor may combine the physical page number with the corresponding offset to obtain the specific location addressed by a user process.

Processors usually keep such translations in structures known as page tables. However, since page tables are typically large, processor usually cache the most frequently accessed translations in a translation look aside buffer (TLB). The TLB may be structured like a cache, however, the present disclosure is assuming a full-associative TLB. Each TLB entry usually includes a VPN, a PPN and an offset.

Although the present disclosure focuses on a simple TLB with each entry containing a VPN, a PPN, and an offset, modern instruction set architectures, such as the Itanium® architecture, may require several other objects in a TLB entry. For the purpose of this disclosure, however, any remaining objects may be treated in a manner similar to the PPN and offset and called the payload. Thus, in the present invention, a TLB entry may contain a VPN and a corresponding payload.

Because the TLB is a large structure, it needs to be protected with some form of error detection and/or correction scheme. Error detection and/or correction schemes protect processor structures from experiencing single bit upsets caused by neutron particles coming from space or alpha particles coming from packaging material. Parity bits are often calculated for and stored with corresponding data in large storage structures, such as a TLB, for the purpose of detecting errors, including soft errors occurring in those storage structures.

Throughout the specification, the term, "instruction" is used generally to refer to instructions, macro-instructions, instruction bundles or any of a number of other mechanisms used to encode processor operations.

Referring now to FIG. 1, there is shown a multiprocessor system 100 including multiple processors $105_1$-$105_n$. When an instruction is fetched, the processor $105_1$ accesses the TLB 110. The TLB translates the instruction for the processor $105_1$. The translation of the instruction by the TLB gives the processor the address associated with the instruction. This address is then fetched from a memory unit 115. Once the processor has the address of the instruction, the processor may now fetch the instruction.

For the processor to fetch the instruction, an instruction fetch unit 120 decodes the instruction. Once decoded, the instruction goes into a scheduler 125 which shuttles the instruction for execution by an execution unit 130. The execution unit 130 may, depending on the type of instruction it is, for example if it's a memory instruction, may look up the instruction in a data translation buffer (DTB) 135. The address is then translated and goes to the memory unit 115 and returns the data back to the processor for execution.

Once the processor has the translated address, the memory unit 115, if it does not have the information locally, may obtain the information by communicating with a coherence protocol engine 140 through a local interconnect 145. The local interconnect 145 may be a bus, a point-to-point interconnect or may be a two point or multidrop bus in other embodiments. Various known or otherwise available bus, interconnect, or other communication protocols may be employed to allow communications with other external components such as memories, other processors, I/O components, bridges, etc.

The coherence protocol 140 may decide in the multiprocessor system 100 where to fetch the information. The information may be found in an extended cache 150 that is not in a processor. Otherwise, the protocol 140 may determine through a source address decoder (SAD) 155 that this piece of memory is in a local memory 160 attached to the processor. The SAD may also determine that for an I/O hub 165, its memory may be connected to a peripheral device 170 or additional processors 175. The source address decoder may perform the translation of any given address. The coherence protocol 140 communicates with the I/O hub 165 or processing units 175 through a bus. This bus may be any type of bus described above.

Figure 2:
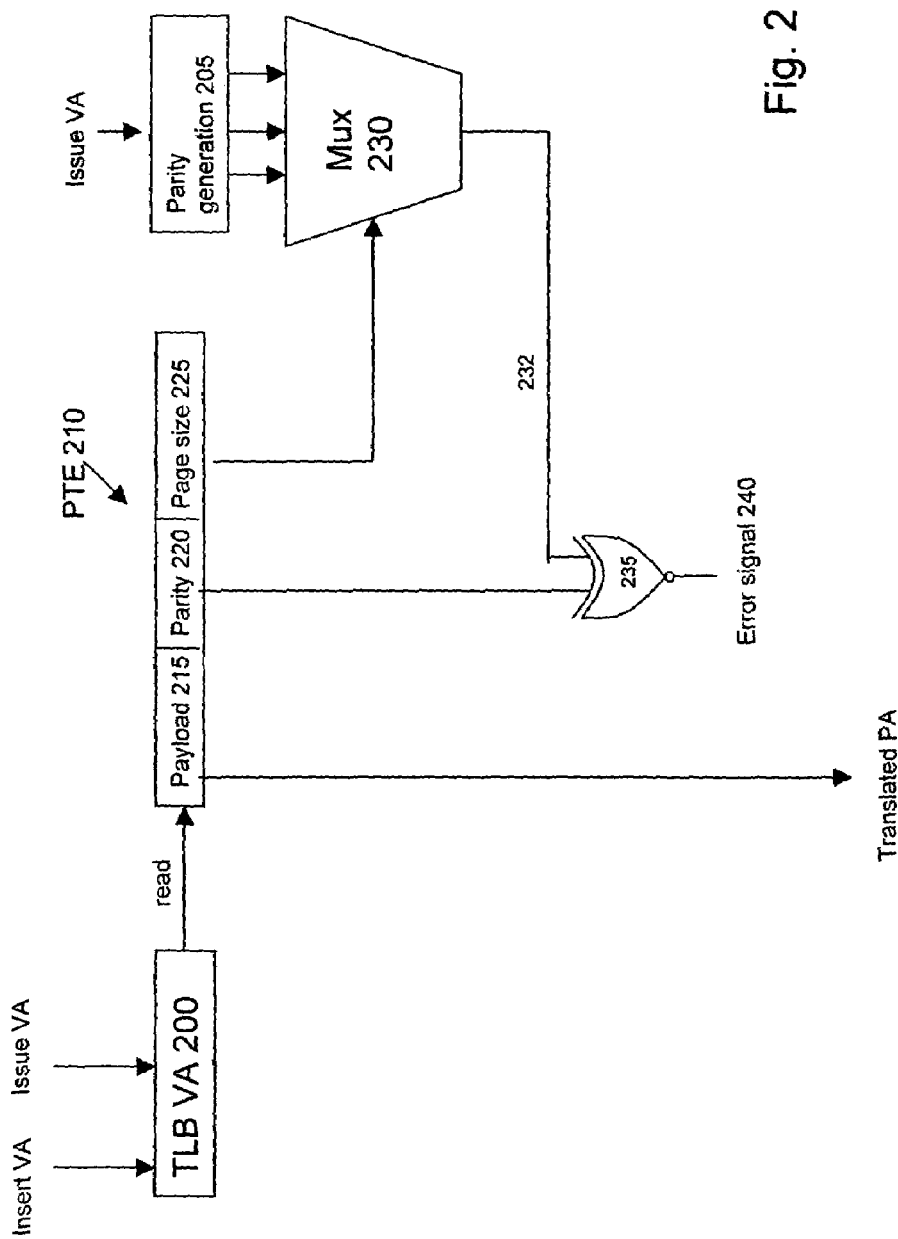
FIG. 2 is a block diagram of one embodiment protecting a TLB's VPN from soft errors.

FIG. 2 illustrates one example embodiment of computing parity of the VA. Initially, an issue VA CAMs a TLB's VPN 200. In parallel with the CAM operation, the issue VA computes parity 205 for possible page sizes supported by the processor. A processor typically supports various page sizes. In IPF, the page range is programmable, and it may be anywhere from 4 K to 4 Gbytes. The operation of FIG. 2 computes the parity bits for every possible page size. When the processor copies a page table entry (PTE) into a TLB entry (perhaps after a TLB miss), it knows the page size corresponding to the address. Thus, at the TLB entry insertion point, the processor may compute the parity for the appropriate VPN bits (corresponding to the correct page size). This parity bit is stored in the TLB entry's payload along with an encoded page size.

A page table entry (PTE) 210 may store payload 215, parity 220 and page size 225. The stored page size 225 is not necessarily the true page size associated with the PTE 210. It may be an encoding of the protected page sizes which may not be a complete set of the page sizes.

If a matching VPN is found during the CAM operation in the TLB 200, the payload 215 is read out of the PTE 210 to obtain the translated PA. The encoded page size 225 and the set of pre-computed VA parity 205 is inputted to a MUX 230 to select which one of the set of pre-computed VA parity 205 to compare with the stored parity 220 in the TLB entry. The output of the MUX 230 is the generated parity 232 which then is input to a XOR gate 235. The generated parity 232 is then XORed with the stored parity 220 to determine if there was an error 240.

The error signal 240 notifies the processor if the parity is correct. If there is a parity error then the processor knows that the VA of the stored parity does not match the generated VA parity of the incoming address. Therefore, an error has occurred in the TLB.

Figure 3:
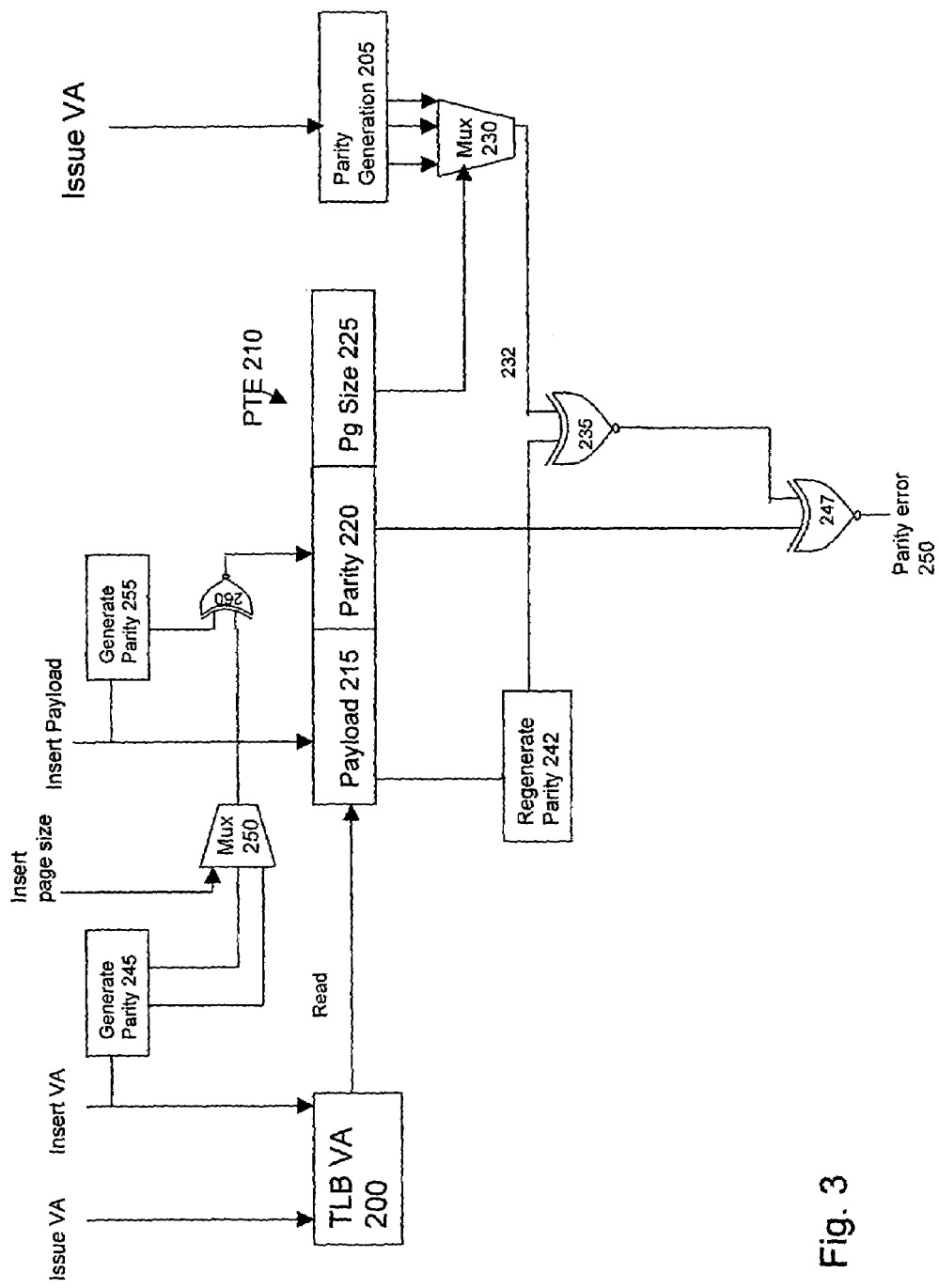
FIG. 3 is a block diagram of a second embodiment protecting a TLB's VPN from soft errors.

FIG. 3 illustrates one example embodiment of protecting parity error during a TLB lookup. During a CAM operation, both the insert and issue VA are inserted into TLB 200. In parallel with the CAM operation, the issue VA computes parity 205 for possible page sizes supported by the processor. Prior to the CAM operation, the insert VA generates parity 245 which is input to a MUX 250. An insert page size is also inputted to the MUX 250 to select the page size the processor currently needs.

An insert payload is inputted into the payload 215 and the processor generates parity 255 from the insert payload. The output of the parity generated for the payload is combined with the encoded page size 232. Both of these outputs are then compared 260 and written into the parity field 220 in the PTE 210.

During the look-up, the processor CAMs the TLB VA 200 and computes parity. If a matching VPN is hit on one of the entries of the VA array, then the payload is read out of the PTE 210. The encoded page size 225 is used to select 205 which of the precomputed parity for the issue VA is currently needed by the processor. The encoded page size 232 is compared 235 with the regenerated parity on the payload 242. The output of this comparison 235 is then compared 247 with the same parity 220 inserted into the PTE 210. If the two are not the same then a parity error has occurred in the TLB lookup.

On the lookup, the appropriate VPN parity would be selected by the encoded page size bits 232 and combined 235 with the regenerated parity 242 of the TLB read payload. The sum would then be compared 247 to the stored TLB parity 220 to detect errors in the full TLB entry.

Therefore, the processor first determines the matching VPN followed by a check on the parity bit corresponding to the VPN. If the first step does not produce a CAM match, then it could either be a true mismatch or a false mismatch. A true mismatch is when the CAM operation does not find a match in the TLB entry. In this case, the processor may initiate TLB miss flow and fetch the corresponding TLB entry from the page table. A false mismatch may arise because a bit upset in either the TLB tuple or the incoming tuple may cause a mismatch and force a miss flow to be initiated. However, this does not cause incorrect operation, because this entry is most likely to be evicted out of the TLB following the TLB's usual replacement policy (e.g., least recently used). Therefore, both of these cases should be acceptable.

If there is a match, but the parity bits are different, then the processor may have encountered a single bit upset either in the incoming VPN or parity bit, or in the stored VPN or parity bit. If there is a parity match, then TLB lookup succeeded with no error. Thus, this scheme allows a processor with multiple page sizes to eliminate single bit upsets from soft errors in a TLB entry's VPN.

Figure 4:
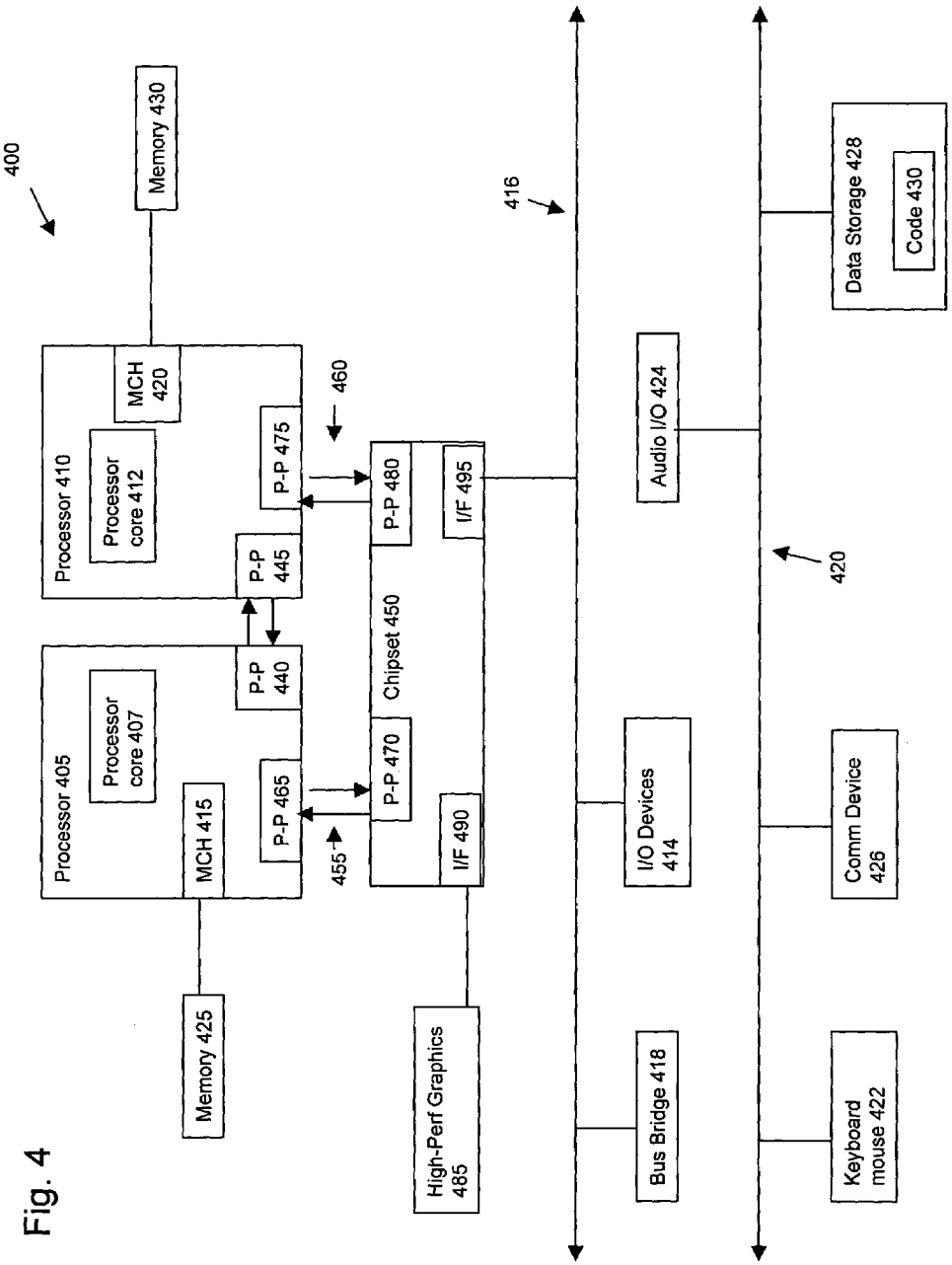
FIG. 4 is a block diagram of a system to provide an environment for multithreaded processors protecting a TLB's VPN from soft errors.

FIG. 4 is a block diagram of a system that provides an environment for multithreaded processors to protect a TLB's VPN from soft errors. The system 400 generally shows a system where processors, memory, and input/output devices are interconnected by a number of point-to-point interfaces. The system 400 may also include several processors, of which only two, processors 405, 410 are shown for clarity. Each processor 405, 410 may each include a processor core 407, 412, respectively. Processors 405, 410 may each include a local memory controller hub (MCH) 415, 420 to connect with memory 425, 430. Processors 405, 410 may exchange data via a point-to-point interface 435 using point-to-point interface circuits 440, 445. Processors 405, 410 may each exchange data with a chipset 450 via individual point-to-point interfaces 455, 460 using point to point interface circuits 465, 470, 475, 480. Chipset 450 may also exchange data with a high-performance graphics circuit 485 via a high-performance graphics interface 490.

The chipset 450 may exchange data with a bus 416 via a bus interface 495. In either system, there may be various input/output I/O devices 414 on the bus 416, including in some embodiments low performance graphics controllers, video controllers, and networking controllers. Another bus bridge 418 may in some embodiments be used to permit data exchanges between bus 416 and bus 420. Bus 420 may in some embodiments be a small computer system interface (SCSI) bus, an integrated drive electronics (IDE) bus, or a universal serial bus (USB) bus. Additional I/O devices may be connected with bus 420. These may include keyboard and cursor control devices 422, including mouse, audio I/O 424, communications devices 426, including modems and network interfaces, and data storage devices 428. Software code 430 may be stored on data storage device 428. In some embodiments, data storage device 428 may be a fixed magnetic disk, a floppy disk drive, an optical disk drive, a magneto-optical disk drive, a magnetic tape, or non-volatile memory including flash memory.

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

What is claimed is:

1. A method comprising:
    determining a translation lookaside buffer (TLB) entry associated with an incoming virtual address, the TLB entry included in a translation lookaside buffer (TLB) within a processor;
    computing a plurality of computed parity values based on the incoming virtual address, wherein each of the plurality of computed parity values correspond to one of a plurality of possible page sizes associated with the virtual address;
    selecting a selected computed parity value of the plurality of computed parity values based on a page size value associated with the TLB entry;
    regenerating a regenerated parity value for the TLB entry based on a payload held in the TLB entry;
    performing a first logical operation on the regenerated parity value and the selected computed parity value to obtain a first parity value;
    performing a second logical operation on a stored parity value held in the TLB entry and the first parity value to obtain a second parity value, wherein the second parity error value, when representing an error value, is to indicate an error in the TLB.

2. The method of claim 1, wherein the first and the second logical operations include XOR operations.

3. The method of claim 1, wherein determining a translation lookaside buffer (TLB) entry associated with an incoming virtual address comprises performing a CAM operation in the TLB based on the incoming virtual address.

4. The method of claim 3 wherein computing a plurality of pre-computed parity values based on the incoming virtual address is at least partially done in parallel to performing the CAM operation in the TLB based on the incoming virtual address.

5. An apparatus comprising:
    a translation buffer to hold a translation buffer (TB) entry, wherein the TB entry is to include a stored virtual address, a stored parity value, and a stored page size value;
    content addressable memory (CAM) logic coupled to the translation buffer to perform a CAM operation to identify the TB entry in response to an incoming virtual address matching the stored virtual address;
    parity generation logic coupled to the translation buffer to generate a plurality of pre-computed parity values based on the incoming virtual address for a plurality of page sizes in parallel with the CAM logic performing the CAM operation to identify the TB entry;
    selection logic coupled to the parity generation logic to select a selected pre-computed parity value of the plurality of pre-computed parity values based on the stored page size value in the TB entry;
    parity error logic coupled to the translation buffer and the selection logic to determine if the TB entry is associated with a parity error based on the selected pre-computed parity value and the stored parity value.

6. The apparatus of claim 5 further comprising regeneration logic to regenerate a new parity value from the stored virtual address included in the TB entry, wherein parity error logic coupled to the translation buffer and the selection logic to determine if the TLB entry is associated with a parity error based on the pre-computed parity value and the stored parity value comprises parity error logic to perform a first logical operation on the new parity value and the selected pre-computed value to generate a combined output and to perform a second logical operation on the stored parity value and the combined output to determined if the TLB entry is associated with the parity error.

7. The apparatus of claim 6 wherein the translation buffer includes a translation lookaside buffer (TLB) in a microprocessor, the TLB hold translations between virtual and physical addresses.

8. A system comprising:
    a first processor, comprising:
        a translation buffer (TB) to receive an incoming virtual address, the TB to generate a plurality of pre-computed parity values for a plurality of corresponding possible page sizes based on the incoming virtual address in parallel to performing a lookup operation to identify a translation buffer entry (TBE) associated with the incoming virtual address, wherein the TB includes regeneration logic to generate a new parity value from a payload held in the TBE and parity logic coupled to the regeneration logic to determine if the TBE includes a parity error based on at least a selected pre-computed parity value of the plurality of pre-computed parity values and the new parity value, wherein the selected pre-computed parity value is to be selected based on a page size held in the TBE; and
    an interface to be coupled to an input/output device.

9. The system of claim 8 wherein the lookup operation includes a content addressable memory (CAM) search of the TB to identify the TBE.

10. The system of claim 9 wherein the TB includes a multiplexer to take the page size held in the TBE as a select signal to select the selected pre-computed parity value from the plurality of pre-computed parity values.

11. The system of claim 10 wherein the TB also includes first combination logic to combine the selected pre-computed parity value with the new parity value into a first combined output.

12. The system of claim 11 wherein the TB farther includes second combination logic to combine the first combined output with a stored parity value held in the TBE to form a parity output, wherein the TB is to determine a parity error exists in response to the parity output indicating a parity error exists.

13. The system of claim 12 wherein the interface includes a point to point interface to be coupled through a point-to-point interconnect to a controller hub, the controller hub being coupled to the I/O device.

14. The system of claim 13 wherein the first and the second combination logic each include an XOR gate.

* * * * *

UNITED STATES PATENT AND TRADEMARK OFFICE
CERTIFICATE OF CORRECTION

PATENT NO. : 7,607,048 B2  
APPLICATION NO. : 11/026633  
DATED : October 20, 2009  
INVENTOR(S) : Echeruo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 701 days.

Signed and Sealed this

Twelfth Day of October, 2010

David J. Kappos  
*Director of the United States Patent and Trademark Office*